United States Patent
Feist et al.

(10) Patent No.: US 7,172,155 B2
(45) Date of Patent: Feb. 6, 2007

(54) SEAT INTERFACE FOR POWERED SEAT TRACK COVER

(75) Inventors: Samuel J. Feist, Bellevue, WA (US); Douglas S. York, Woodinville, WA (US); Jeffrey M. Camardo, Marysville, WA (US); Trevor M. Laib, Woodinville, WA (US); Bradley J. Mitchell, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/090,882

(22) Filed: Mar. 25, 2005

(65) Prior Publication Data

US 2005/0247820 A1 Nov. 10, 2005

Related U.S. Application Data

(60) Provisional application No. 60/556,747, filed on Mar. 27, 2004.

(51) Int. Cl.
*B64D 11/06* (2006.01)

(52) U.S. Cl. .................. 244/118.6; 244/131; 439/210; 174/70 R; 297/344.1

(58) Field of Classification Search ............. 244/118.5, 244/122 R, 129.1, 118.6, 131; 439/210, 439/110, 131; 174/10, 70 R, 74 R, 209, 174/15.7; 297/344.1, 217.4; 296/65.13
See application file for complete search history.

(56) References Cited

U.S. PATENT DOCUMENTS

| 4,428,078 | A | | 1/1984 | Kuo |
| 4,763,360 | A | * | 8/1988 | Daniels et al. ............. 455/3.06 |
| 4,853,555 | A | | 8/1989 | Wheat |
| 6,267,430 | B1 | * | 7/2001 | Cresseaux ................. 296/65.13 |
| 6,527,566 | B1 | * | 3/2003 | Lambiaso ................... 439/131 |
| 6,601,798 | B2 | * | 8/2003 | Cawley ..................... 244/118.6 |
| 6,619,588 | B2 | * | 9/2003 | Lambiaso ................ 244/118.5 |
| 6,659,402 | B1 | * | 12/2003 | Prochaska ................ 244/118.6 |
| 6,899,390 | B2 | * | 5/2005 | Sanfrod et al. .......... 297/217.4 |

* cited by examiner

*Primary Examiner*—Galen Barefoot
(74) *Attorney, Agent, or Firm*—Harness Dickey & Pierce P.L.C.

(57) ABSTRACT

A power supply system operable to supply power and/or data to aircraft passenger seats that eliminates the need to extend individual cables to each seat and eliminates the need to rewire the passenger cabin when the seats are moved. The system includes a first connector housing secured to a first seat leg and a second connector housing secured to at least one of the first seat leg and the second leg. A first connector of a seat electronic subsystem is mounted to the first housing. A second connector of the seat electronic subsystem is mounted to the second housing. A conductor is operable to mate with at least one of the first connector and the second connector for conducting at least one of data and electricity to or from the seat.

21 Claims, 15 Drawing Sheets

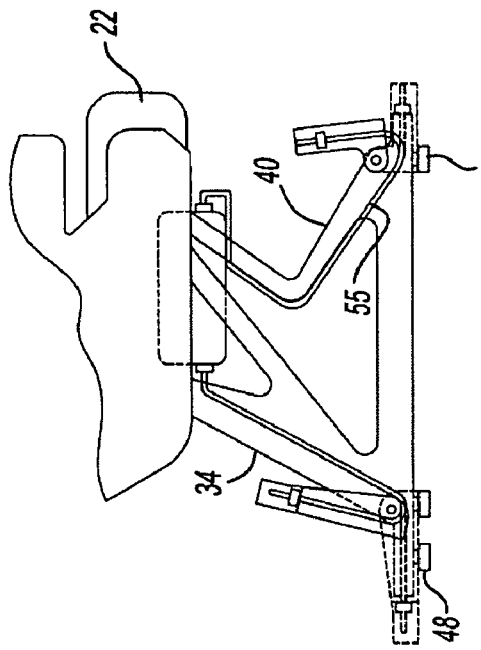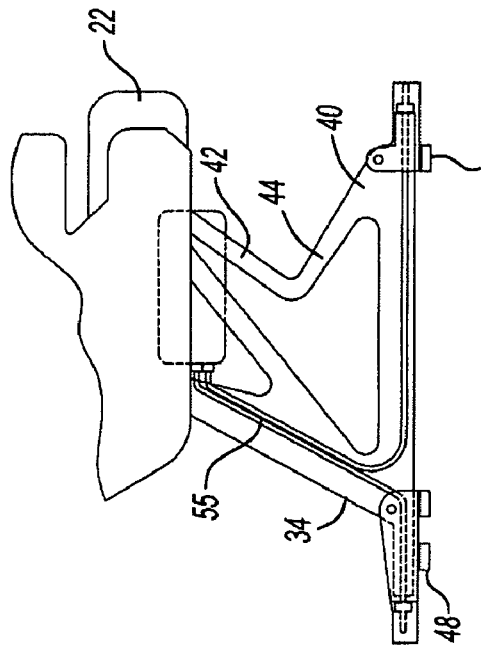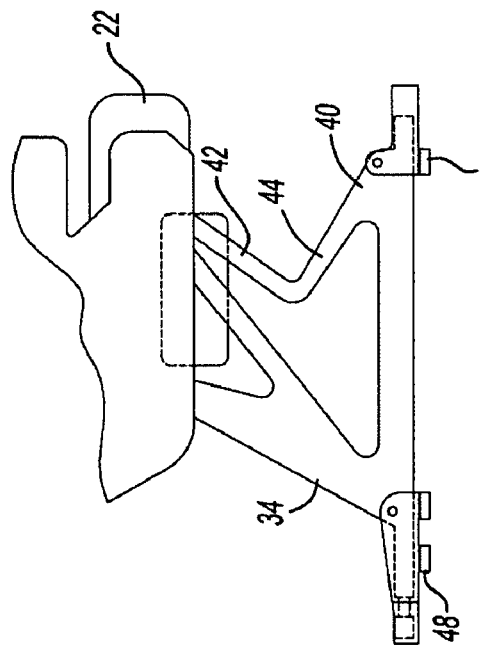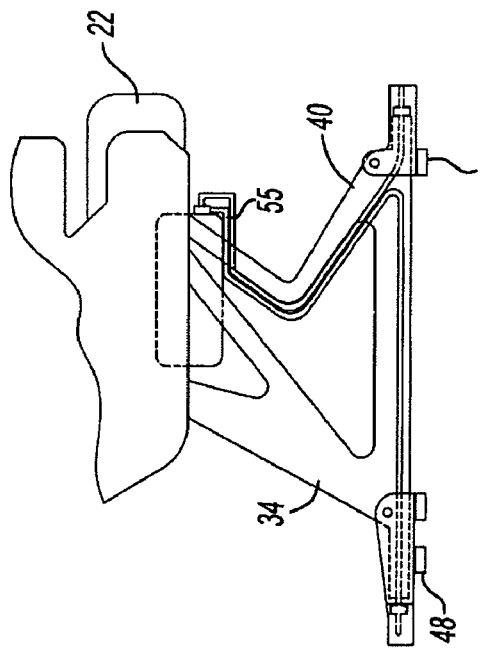

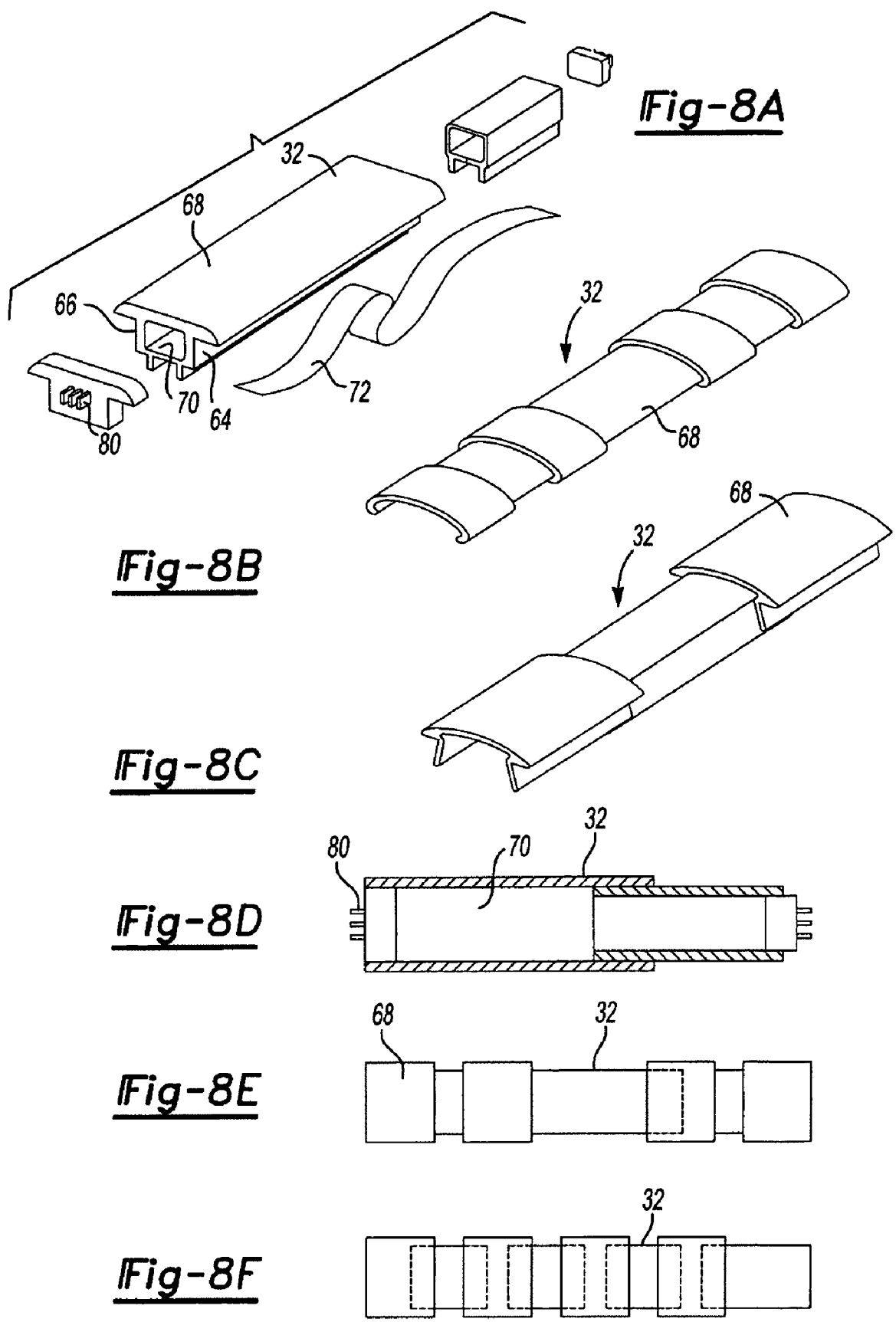

SEAT INTERFACE FOR POWERED SEAT TRACK COVER

CROSS-REFERENCE TO RELATED APPLICATIONS

This application claims the benefit of U.S. provisional application Ser. No. 60/556,747 filed Mar. 27, 2004, which is incorporated herein by reference.

The following applications are also incorporated by reference herein: provisional application Ser. No. 60/556,826 filed on Mar. 27, 2004; provisional application Ser. No. 60/557,044 filed on Mar. 27, 2004; provisional application Ser. No. 60/556,823 filed on Mar. 27, 2004; provisional application Ser. No. 60/556,748, filed on Mar. 27, 2004; U.S. application Ser. No. 10/810,324 filed on Mar. 27, 2004; U.S. application Ser. No. 10/898,729 filed on Jul. 23, 2004; U.S. application Ser. No. 10/936,004 filed on Sep. 8, 2004; U.S. application Ser. No. 10/983,906 filed on Nov. 8, 2004; U.S. application Ser. No. 10/943,035 filed on Sep. 16, 2004; and U.S. application Ser. No. 10/921,553 filed on Aug. 19, 2004.

FIELD OF THE INVENTION

The present invention relates to aircraft electronic systems. In particular, the present invention relates to an extendible power strip which functions to cover a seat track. The extendible power strip provides electrical signals or power to passenger seats in a mobile platform, such as an aircraft.

BACKGROUND OF THE INVENTION

Commercial aircraft passengers are increasingly demanding in-flight entertainment (IFE) and electrical power outlets to operate various electronic devices, such as laptop computers, at their seats. To provide the passenger with such features, electrical power and data must be delivered to each seat. Conventionally, power and data are delivered to aircraft passenger seats via numerous cables that, during aircraft assembly, are laid out in position on the floor of the aircraft passenger cabin. A portion of the cables is positioned beneath a covering, such as the seat track cover, and a portion that includes connectors to the seats is left exposed to connect with the yet to be installed seat groups containing each passenger seat.

During installation of the seat groups, the seat groups must be carried in over the exposed wires. Taking care to avoid the exposed wires increases both the complexity of the operation and the amount of time required to install the seats. Once the seats are installed, installers must crawl along the floor of the aircraft to manually attach each wire to each seat group. This process is cumbersome and time consuming. Further, in order to change the configuration of the seats or to replace the seats, an installer must again crawl along the floor, disconnect the wiring from each group, and maneuver the seats around the exposed wiring. Still further, in order to change the position of the seat groups, the aircraft must be re-wired so that the wiring will reach the seats in their new positions. As would be expected, re-wiring an aircraft is a costly and time consuming process.

In view of the foregoing, it is desirable to provide an improved device for delivering power to aircraft passenger seat groups that will eliminate the need to separately connect each seat group to an individual power or data cable and the need to re-wire the power cables when the seat configuration is changed.

SUMMARY OF THE INVENTION

A power supply system operable to supply power and/or data to aircraft passenger seats that eliminates the need to extend individual cables to each seat and eliminates the need to rewire the passenger cabin when the seats are moved.

In one embodiment, the system includes a first connector housing secured to a first seat leg and a second connector housing secured to at least one of the first seat leg and the second leg. A first connector of a seat electronic subsystem is mounted to the first housing. A second connector of the seat electronic subsystem is mounted to the second housing. A conductor is operable to mate with at least one of the first connector and the second connector for conducting at least one of data and electricity to or from the seat.

In another embodiment, the present invention provides for a system for providing at least one of data and electricity to passenger seats of an aircraft passenger cabin. The system includes a seat track and a seat secured to the seat track. A first connector housing is proximate to the seat track at a first end of a passenger seat. A second connector housing is proximate to the seat track at a second end of the passenger seat. A first connector of the seat electronic subsystem is mounted to said first housing. A second connector of the seat electronic subsystem is mounted to the second housing. A conductor is positioned at the seat track and is operable to mate with at least one of the first connector and the second connector to conduct at least one of data and electricity to and from the seat.

In a further embodiment, the present invention provides for a method for distributing at least one of data and electricity throughout an aircraft passenger cabin. The method includes installing a passenger seat within a seat track of a passenger cabin. A first connector housing of the passenger seat is rotated from a position in which the first connector housing is approximately perpendicular to a longitudinal length of the seat track to a position in which the first connector housing is approximately parallel to a longitudinal length of the seat track. A second connector housing of the passenger seat is rotated from a position in which the second connector housing is approximately perpendicular to a longitudinal length of the seat track to a position in which the second connector housing is approximately parallel to a longitudinal length of the seat track. A conductor seated at the seat track is connected to a connector of one of the first and second connector housings to conduct at least one of data and electricity to and from the seat.

In still another embodiment, the present invention provides for a system for transferring at least one of data and electricity to or from an aircraft passenger seat mounted to a seat track of an aircraft passenger cabin. The system includes a first connector housing rotatably secured to a first seat leg of the aircraft passenger seat. A second connector housing is rotatably secured to a second seat leg of the aircraft passenger seat. A first connector of a seat subsystem is mounted to the first housing, the seat subsystem is operable to provide at least one of current and data throughout the seat. A second connector of the seat subsystem is mounted to the second housing. A conductor is operable to mate with at least one of the first connector and the second connector for conducting at least one of data and electricity to and from the seat. The first housing and the second housing are pivotally rotated to a raised position when the seat is moved, installed, or removed from the passenger cabin to protect the first and second housing. The first housing and the second housing are rotated to a lowered position when the seat is secured to the seat track so that the first housing and second housing are substantially parallel with the seat track.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein:

FIGS. 4A–4D represent various wiring schemes for the seats shown in FIGS. 1 and 2;

DETAILED DESCRIPTION OF THE PREFERRED EMBODIMENTS

The following description of the preferred embodiments is merely exemplary in nature and is in no way intended to limit the invention, its application, or uses.

Figure 1:
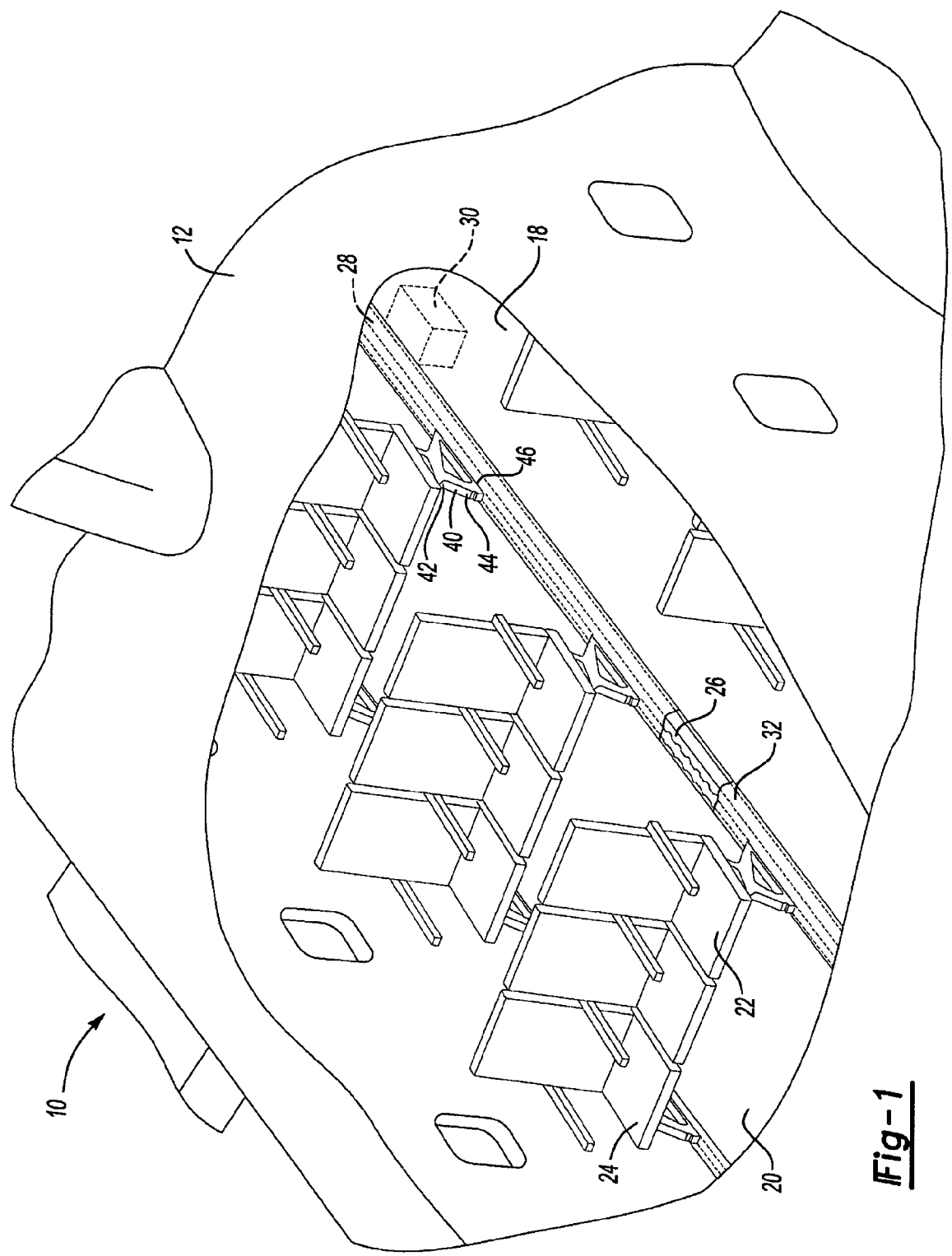
FIG. 1 represents an aircraft utilizing a power distribution system according to the teachings of the present invention.

With initial reference to FIG. 1, a mobile platform in the form of a passenger aircraft equipped with a power distribution system according to the present invention is illustrated at reference numeral 10. It will be appreciated, however, that the present invention is not limited to use only in commercial aircraft and can be implemented in any form of mobile platform, such as a ship, train, bus, motor craft, etc.

The aircraft 10 generally includes a fuselage 12, wings 14, and a tail fin 16. The fuselage 12 includes a passenger cabin 18 having a floor 20. At the floor 20 are numerous passenger seats 22. Two or more passenger seats 22 are grouped together as a seat group 24. One or more seat tracks 26 extend along the floor 20 to secure the seat groups 24 into position. As described below, a power system 28 for delivering power or electrical signals to the seats 22 extends within, or closely adjacent to, one or more of the seat tracks 26. The power system 28 connects to a power source 30. The seat tracks 26 and the power system 28 are typically covered by a seat track cover 32. In some applications the power source 30 can also be configured to transmit data signals. The data signals can be in the form of current signals or fiber optic signals.

Figure 2:
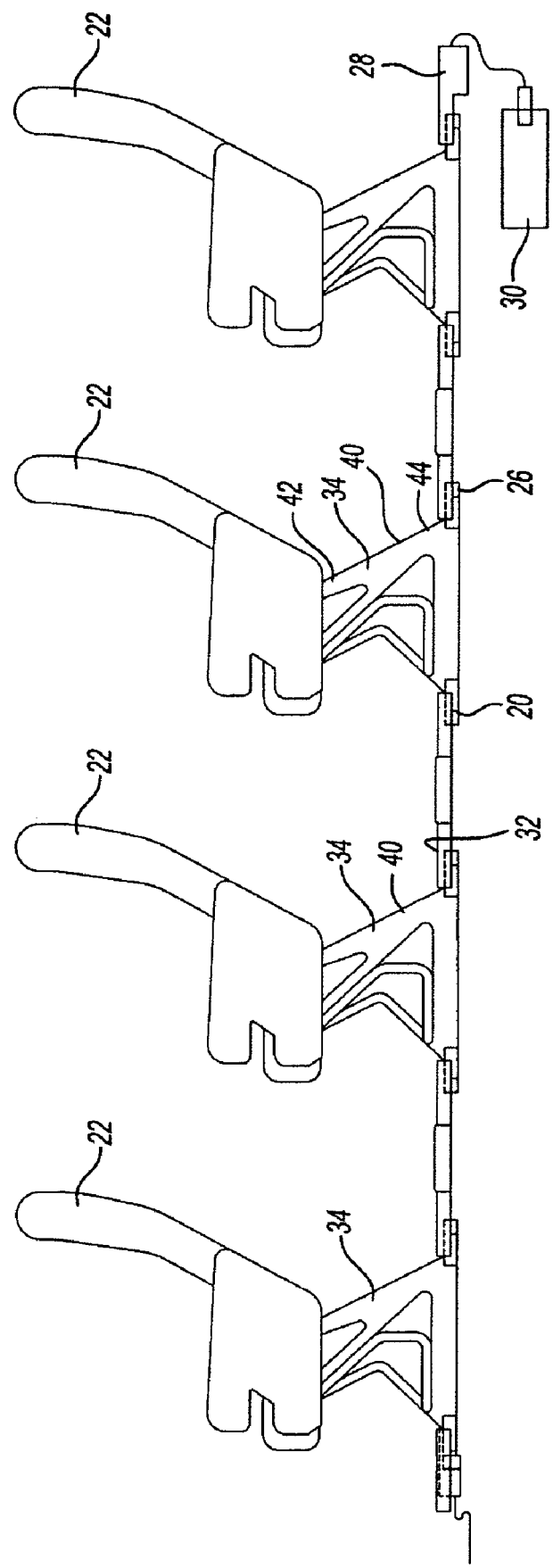
FIG. 2 represents a row of electrically coupled seats shown in FIG. 1.
Figure 3:
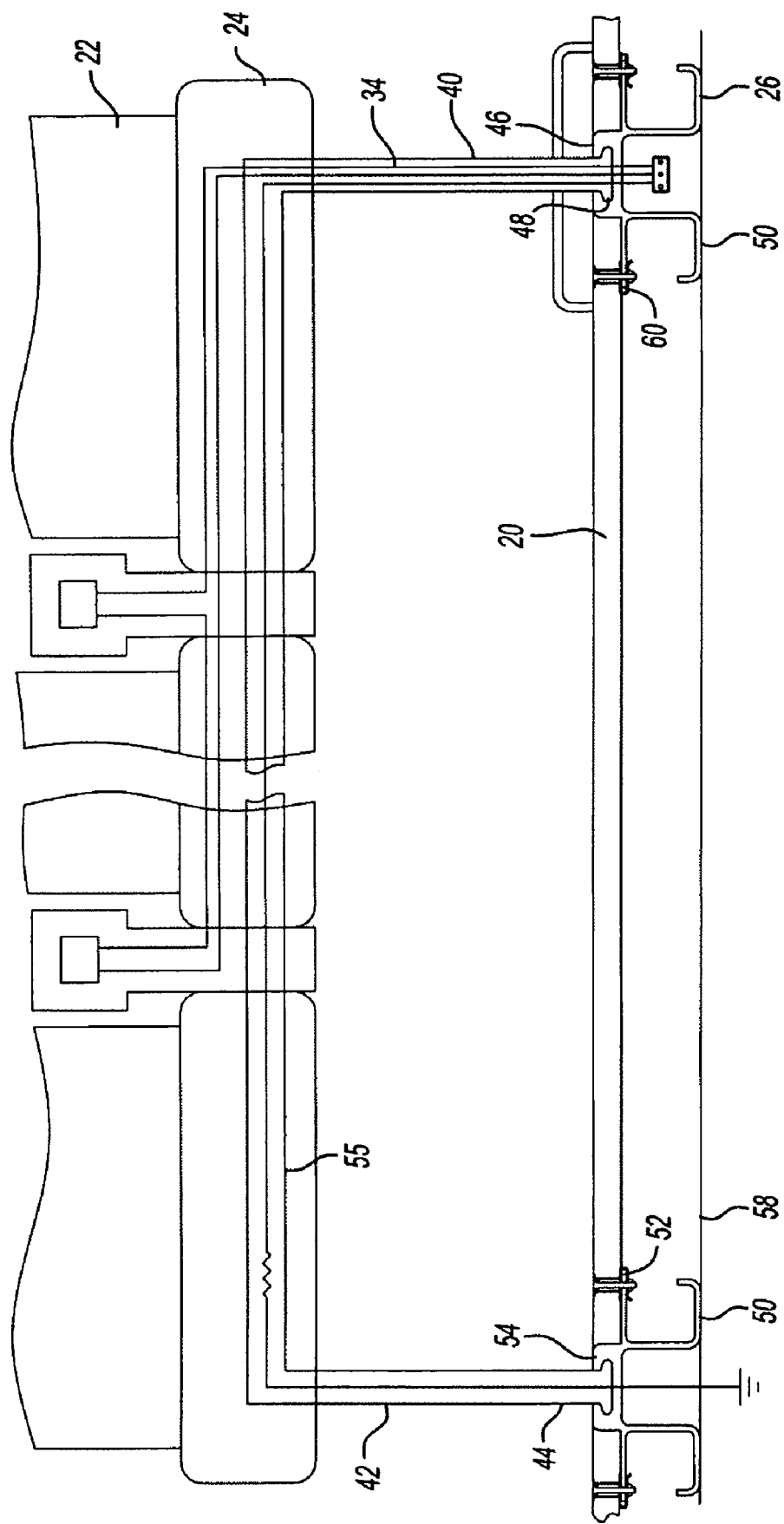
FIG. 3 represents a cross-sectional view of one of the seat rows in FIG. 2.
Figure 5A:
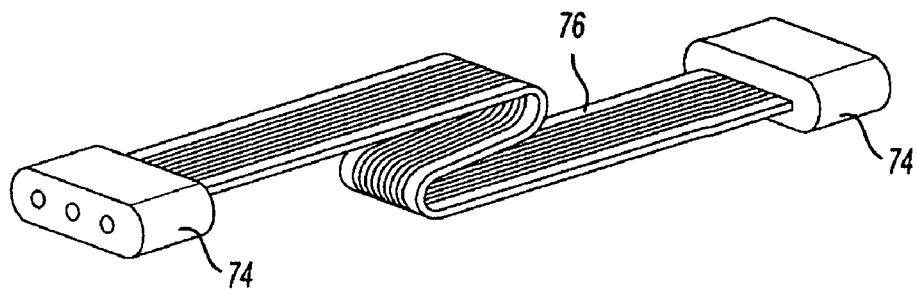
FIGS. 5A–5C represent extendable cords usable in the system shown in FIG. 1.
Figure 5B:
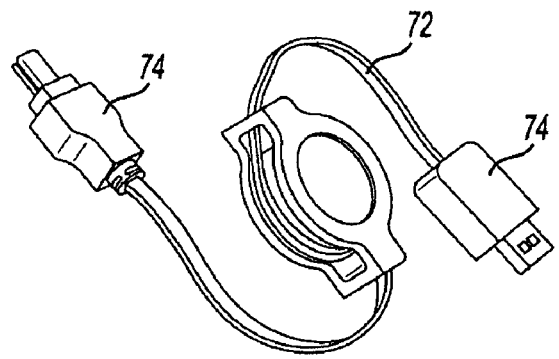
Figure 5C:
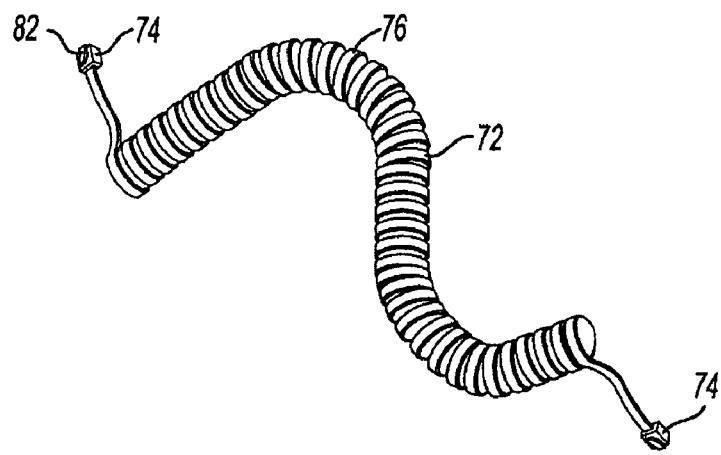

With continued reference to FIG. 1 and 3 and additional reference to FIG. 2, each seat group 24 includes a frame 34. The frame 34 includes legs 40. The legs 40 provide support to the different passenger seats 22. The legs 40 include an upper portion 42 and a lower portion 44. The upper portion 42 mates with or can be integrated with the seats 22. The lower portion 44 includes a fastening surface 46. The fastening surface 46 can be any conventional fastening device capable of securing the seat group 24 to the seat track 26. For example, the fastening surface 46 can include a tab 48 for cooperating with the seat track 26, as described in further detail below. The tab 48 can be, for example, round, square, or rectangular, to be securely received by the seat track 26.

The seat track 26 has a base portion 50, a floor support 52, and a seat engagement portion 54. The base portion 50 includes one or more extensions 56 to support the seat track 26 on a fuselage floor beam 58. The floor support 52 includes one or more protrusions 60 that protrude from the seat engagement portion 54. The protrusions 60 provide support to the floor 20 in the area proximate to the seat track 26. The seat engagement portion 54 includes two arms 62 for cooperating with and securing the legs 40.

With additional reference to FIG. 3, the seat track cover 32 is an elongated strip for covering the seat track 26 which is a component of the power system 28. The seat track cover 32 is somewhat semicircular in shape with a first sidewall 64, a second sidewall 66, and a top portion 68. The first sidewall 64 and the second sidewall 66 extend from the top portion 68 generally at an angle, such that when the cover 32 is placed on a flat surface, such as the floor 20 or carpeting of the floor 20, the cover 32 partially defines a cavity 70 between the flat surface and the cover 32.

As best seen in FIGS. 4a–4d, the seats 22 include a wire harness 55 which brings electrical signals to a predetermined position of the seat 22. As seen the wire harness 55 is configured to bring the signal from a first position adjacent the rear leg, to a second position a front leg. At a first position is a wire harness connector 59, which is used to couple the wire harness 55 to a source of power. Additionally, at the second position is a second connector 61, which couples the wire harness 55 to the next seat 22, in the series.

The power system 28 includes a extendable cable 72 with electrical outlets or connectors 74 are used to couple the seat groups 24. The outlets or connectors 74 can be used to both accept and transmit signals. The extendable cable 72 generally includes an elongated housing 76 having one or more open connectors 78. In this regard, the expandable cable 72 may have a single or multiple retractable loops. The extendable cables 72 are configured to span the multiple lengths which are possible between the variable locations of the seats along the seat track. The connectors include a conductor 80, such as copper, which extends the entire length of the extendable cable 72. The connectors 78 can be numerous different shapes and sizes and can include a locking detail 82. The housing 76 can be made of numerous conventional materials, but is typically made of a resilient material, such as rubber. The connectors 78 can be formed within the housing 76 itself or can be formed as a separate component that is inserted within the housing 76.

Figure 6:
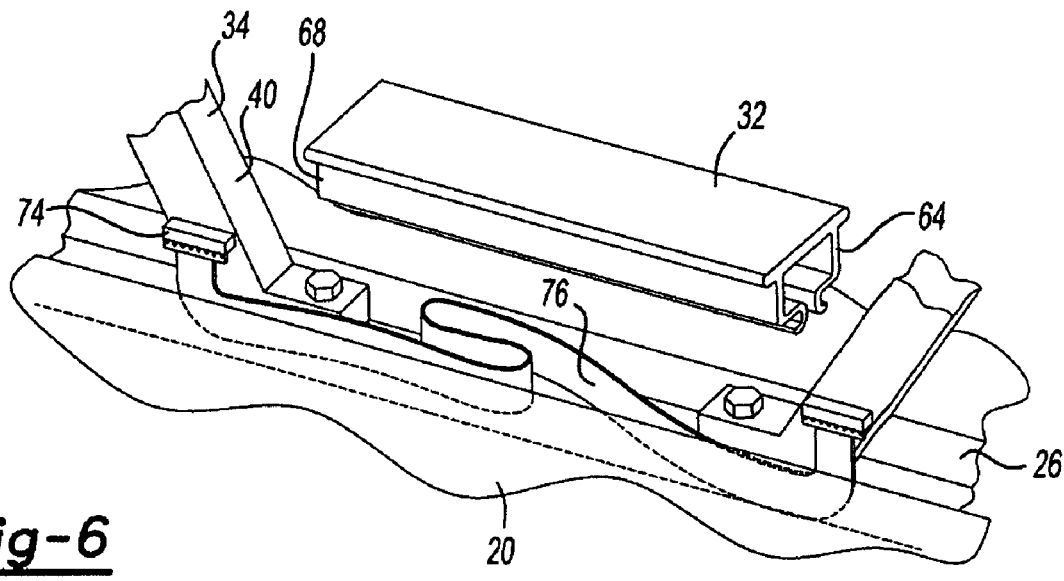
FIG. 6 represents a detailed view of the insertion of an extendable cord and its use within the system.
Figure 7A:
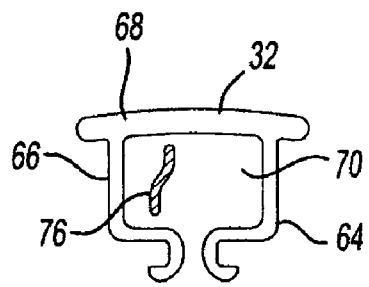
FIGS. 7A–7C represent the track covers according to the teachings of the present invention.
Figure 7B:
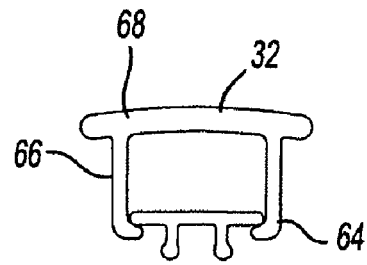
Figure 7C:
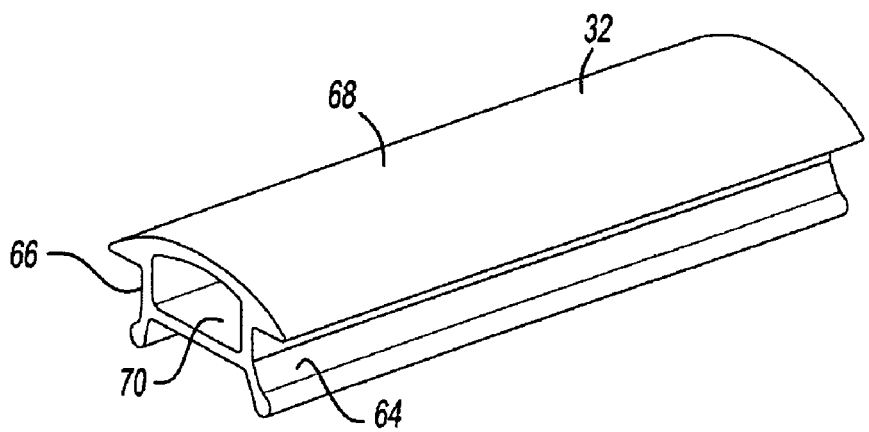

Referring briefly to FIG. 6, the rear leg of the first seat and a forward legs of the second seat are shown coupled to the seat track 26. Disposed within the seat track 26 is the extendible cable 72. The extendable cable 72 is coupled to the first and second wire harness connectors 59 and 61. The seat track cover 32 is snapped into the seat track 26. Seen in FIG. 7a through 7c, the seat track cover 32 can have a plurality of locking flanges configured to couple the seat track cover 32 to the seat track 26.

Figure 8G:
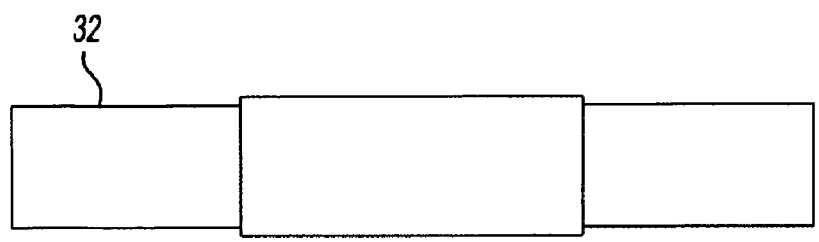
FIGS. 8A–9H represent various seat track covers according to the teachings of the present invention.
Figure 8H:
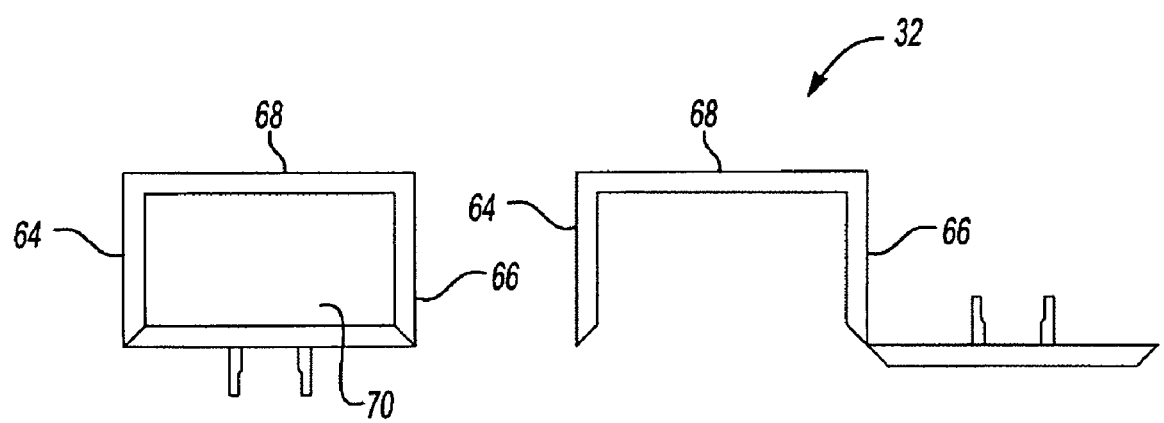
Figure 8I:
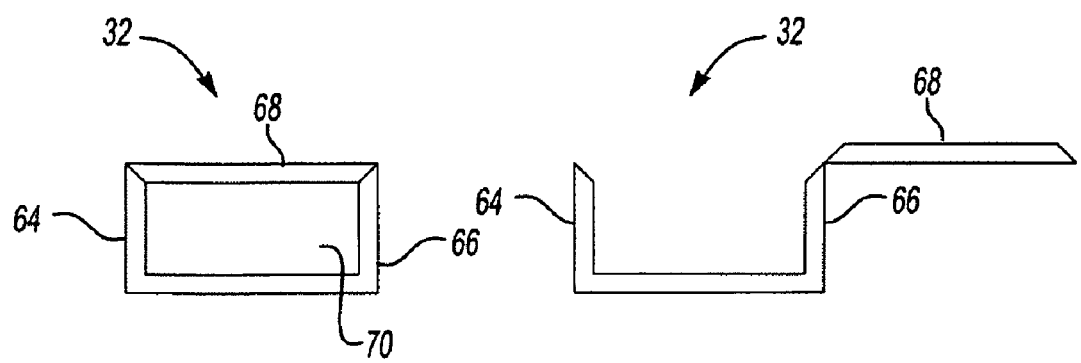
Figure 9A:
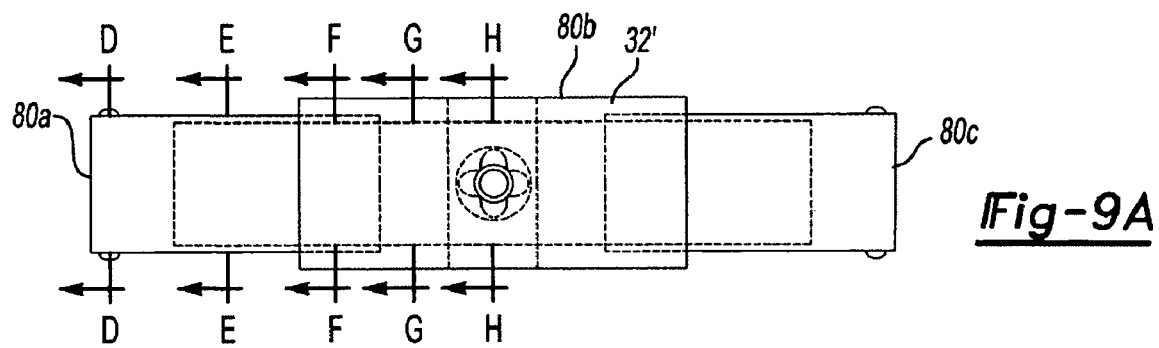
Figure 9B:
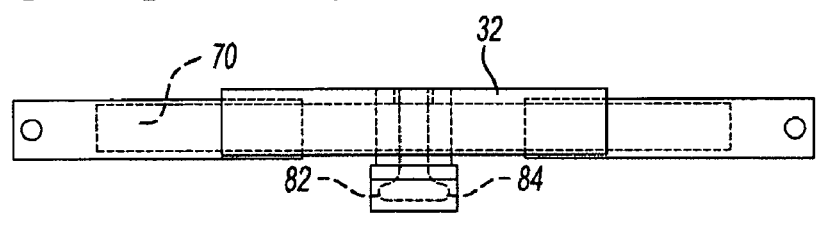
Figure 9C:
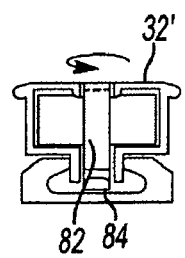
Figure 9D:
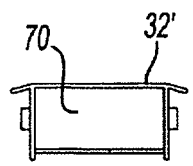
Figure 9E:
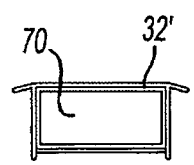
Figure 9F:
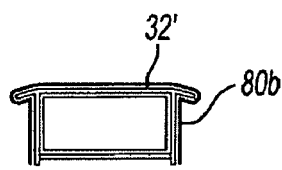
Figure 9G:
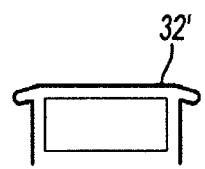
Figure 9H:
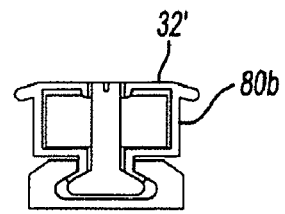
Figure 10:
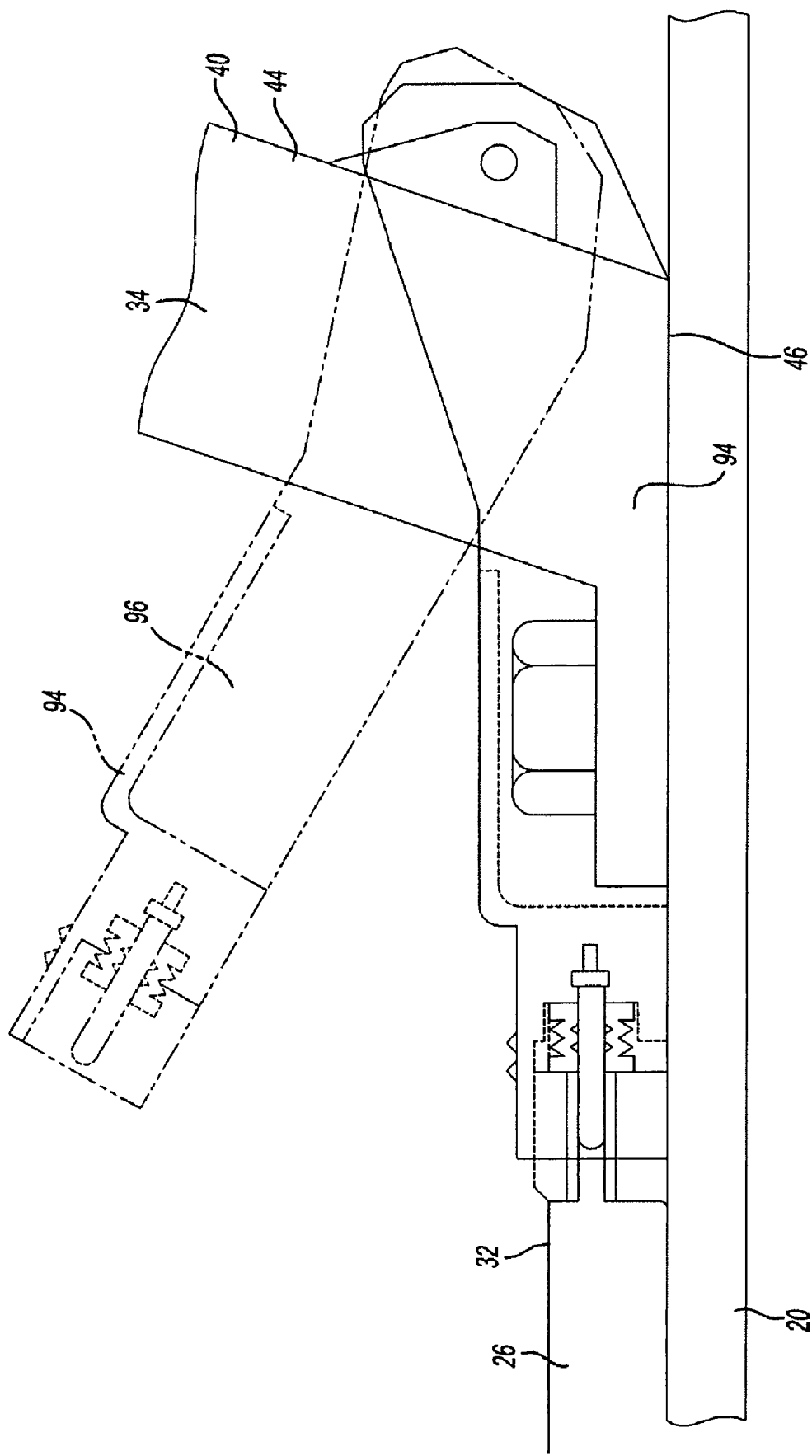
FIGS. 10–11B represent coupling mechanisms between the seats shown in FIG. 1 and the extendable wires shown in FIGS. 5A–5C.
Figure 11A:
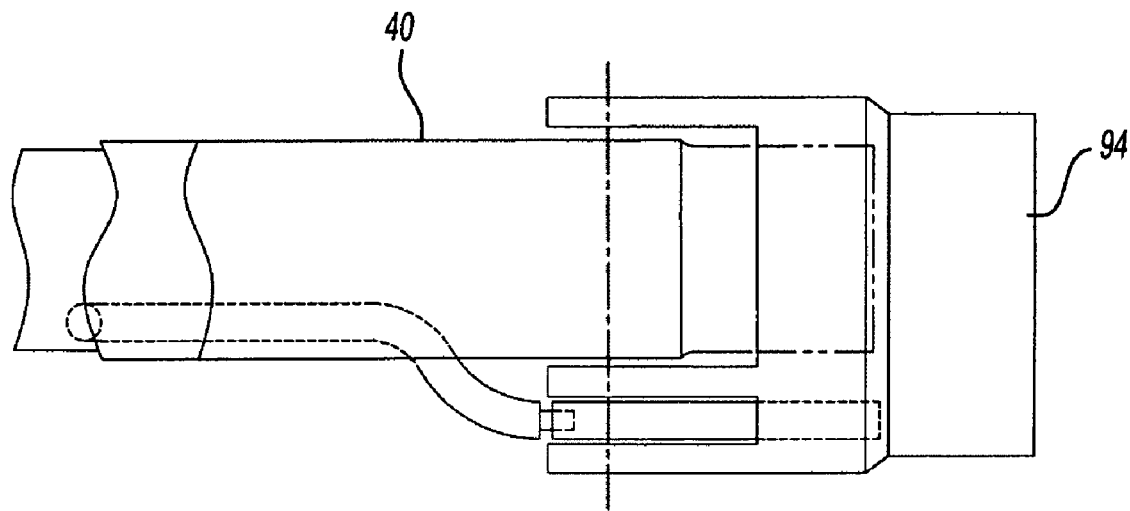
Figure 11B:
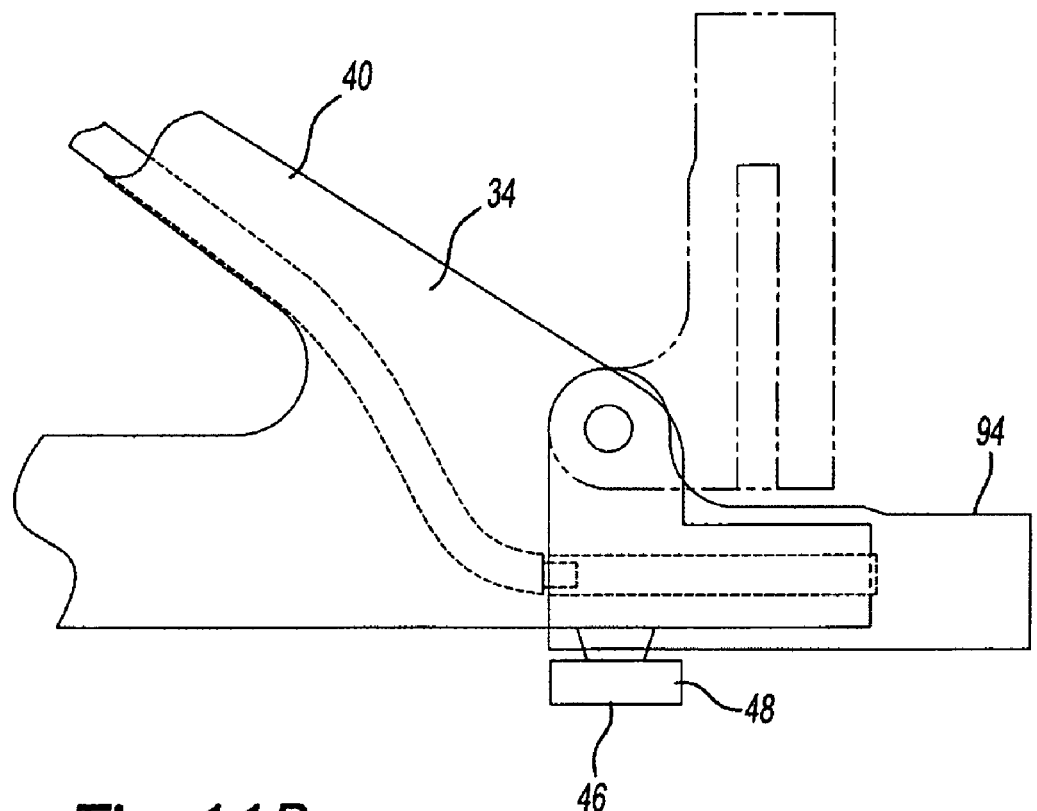
Figure 12:
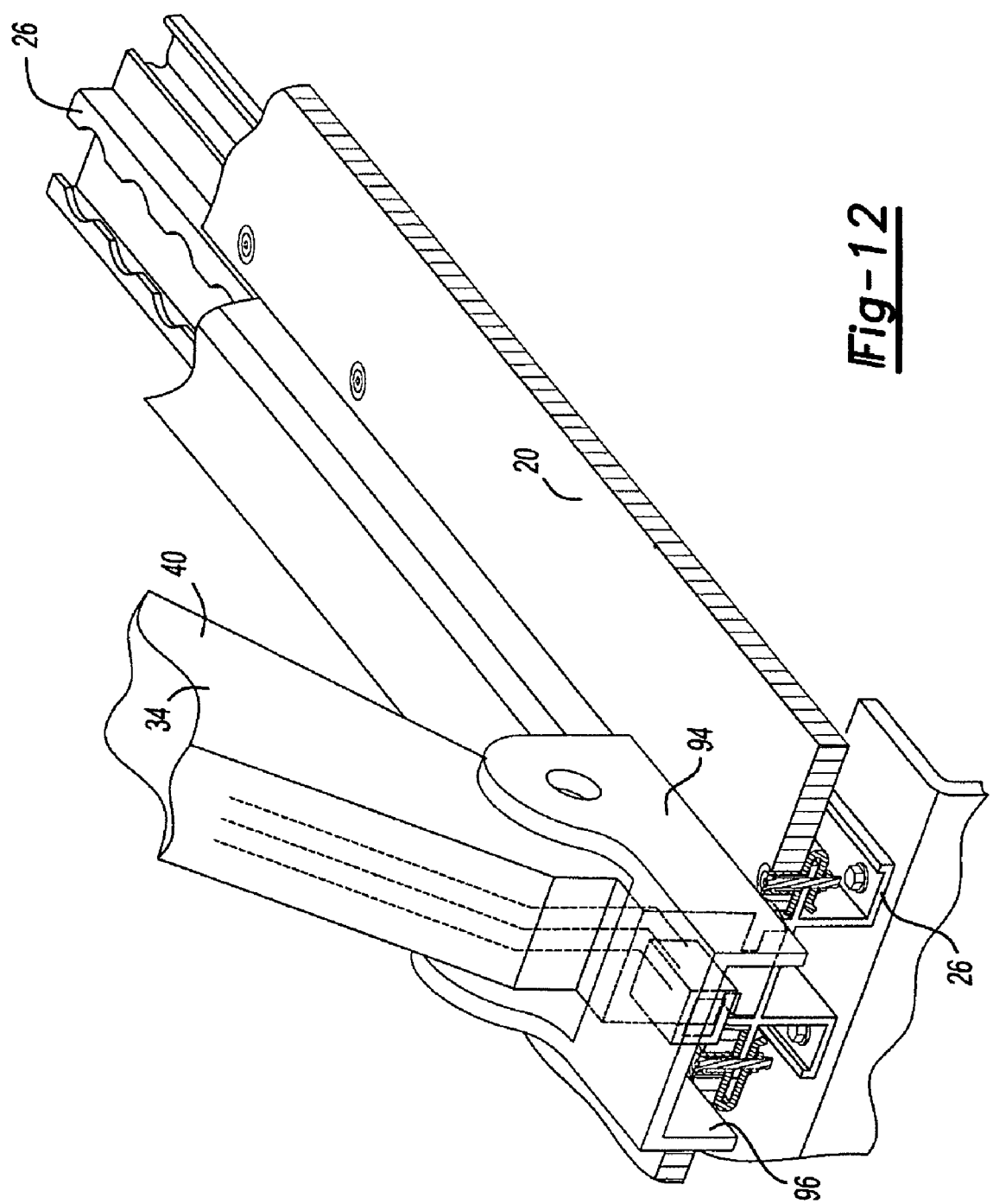
FIGS. 12–15 represent cross-sectional views of alternate seat to seat track couplings shown in FIGS. 1 and 2.
Figure 13:
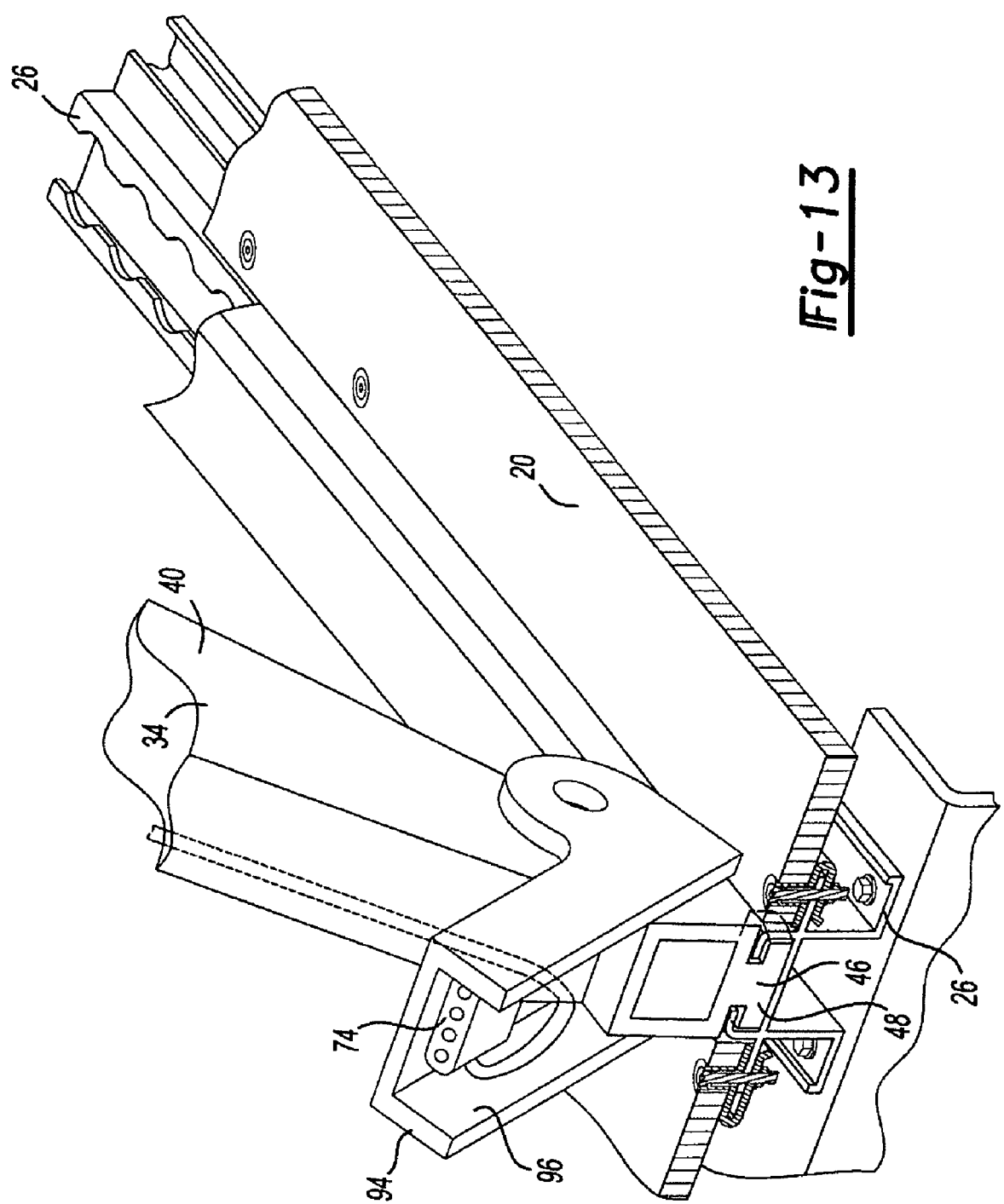
Figure 14:
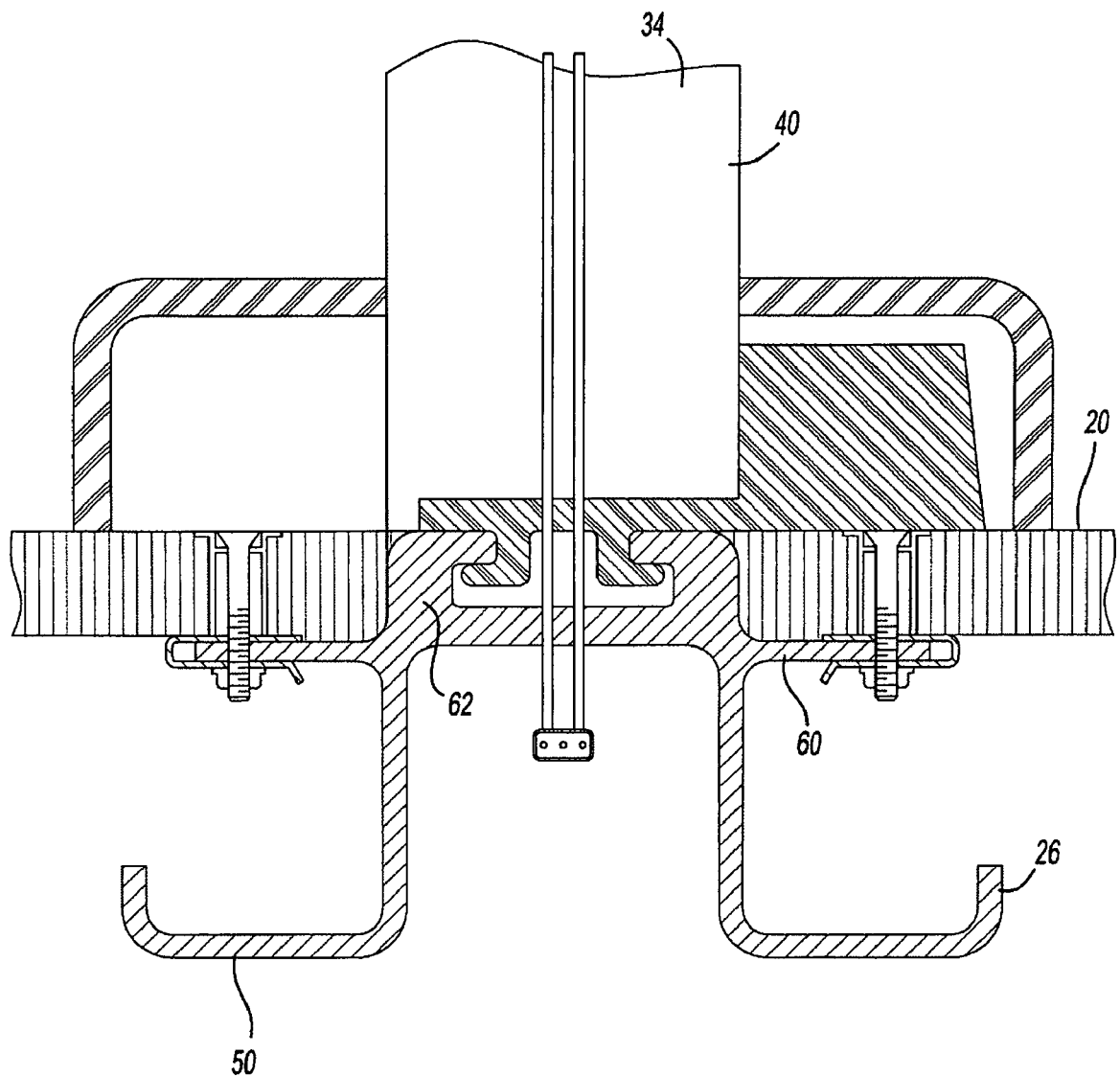
Figure 15:
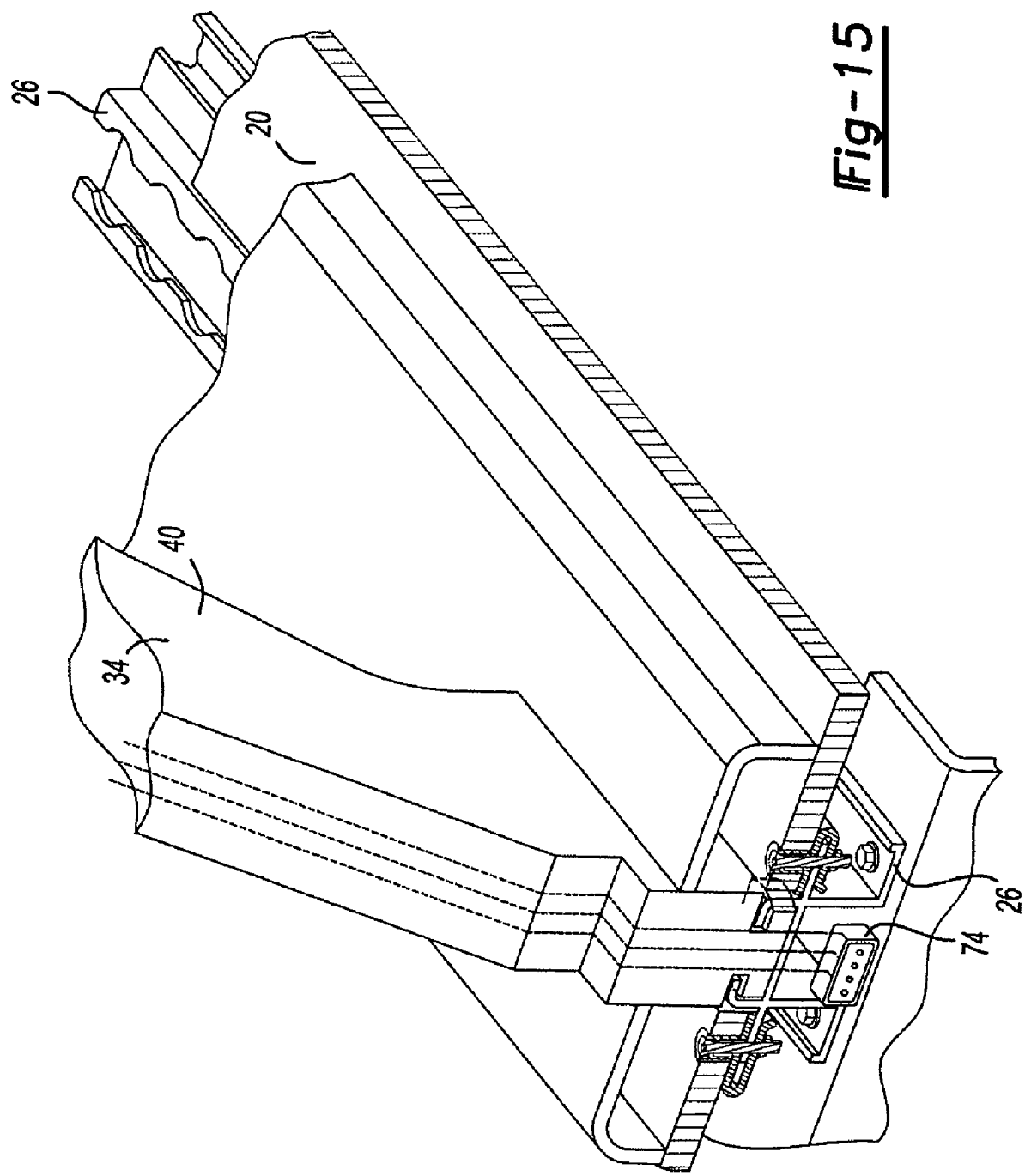

As best seen in FIGS. 8a–8c, the seat cover 32 is formed of multiple components, which are telescopically coupled together. In this regard, the seat track cover 32 is extendable at intervals from a first through a second length to cover the varying distances between the movable seat groups 24. The extendible seat track covers 32 define a through passage 70 configure to at least partially encapsulate the extendible cable 72. The seat track cover 32 can be formed of slidably coupled box sections. Incorporated into the ends of the extendable seat track cover 32 can be a pair of coupling electrical connectors connected to the extendible cover.

FIGS. 9a through 9h represent an alternate seat track cover 32' the seat track cover is formed of three telescopically coupled cover members 80a–c. Disposed through the center member 80b is a locking member 82. The locking member 82 and associated pair of locking flanges 83 are configured to be rotated to lock the seat track cover 32' to the seat track 26. As with the other seat track covers 32 previously disclosed, the seat track cover 32' defines an internal passage 70 which encapsulates the extendable cable 72.

The connectors 74 of the extendable cable 72 include a body 84 and one or more contacts 86. The body 84 is typically a generally rectangular foundation upon which the contacts 86 are mounted. The contacts 86 can be directly mounted to the body 84 or can be mounted upon spring supports to bias the contacts 86 such that the contacts 86 extend outward from the body 84. The contacts 86 can be of any suitable shape or size and of any suitable material, such as copper. To cooperate with the connectors 78, the contacts 86 are typically shaped and sized in a manner that mirrors the shape and size of the connectors 78.

As shown in FIGS. 10 through 13, the connector 74 can be can be secured to the seat leg 40 via a hinged fastening device 94. The hinged fastening device 94 is pivotally coupled to the seat leg 40 to allow rotation of the connector 74 to protection of the connector 74. The hinge fastening device 94 defines an interior cavity 96 configured to be rotated to cover the mechanism used to couple the seat to the seat track. The seat leg 40 additionally can be manufactured to include an incorporated connector 74. Alternatively, the connector can be coupled to the seat wire harness and fixed to the hinged fastening device 94.

Conventional seat legs 40 without the wire harnesses 55 can be retrofitted to include the connector 74 secured to the leg 40. The hinged fastening device 94 permits the connector 74 to pivot between a retracted position in which the connector 74 is vertical and parallel to the seat leg 40, and an extended position in which the connector 74 extends from the seat leg 40 at approximately a right angle to a vertical portion of the leg 40. In addition to the hinged fastening device 94, any other suitable fastening device can be used, such as a rotational fastening device (not shown) in which the connector 74 rotates from the seat leg 40 in the same plane as the floor 20 as it is moved from the retracted position to the extended position.

The cooperation of the above components and their operation will now be described in detail. The seat track 26 is generally positioned just beneath or at the surface of the floor 20 and extends the length of, or at least a portion of the length of, the passenger cabin 18. Portions of the floor 20 are removed just above the seat track 26 to permit access to the seat track from the passenger cabin 18. The aircraft can include any number of seat tracks 26 depending on the application. In some applications, two seat tracks 26 are provided to support each seat group 24 at the floor 20.

The seat track 26 is typically held in position by securing the extensions 56 to the floor beam 58 of the fuselage 12. The extensions 56 are secured to the floor beam 58 in any suitable manner, such as using an adhesive or a fastener, such as a bolt 96 extending through the extensions 56, at numerous positions along the length of the seat track 26. With the seat track 26 secured into position below the floor 20, the floor support 52 provides support to the portions of the floor proximate to the seat track 26.

To further secure the seat tracks 26 into position, additional fasteners can be used along the length of the seat track 26, such as a flush mounted screw, to secure the protrusions 60 of the floor support 52 to the floor 20. Specifically, an insert can be positioned within the floor 20 to receive the flush mounted screw, which further extends through the protrusions 60. With the seat tracks 26 secured in position, the seat groups 24 containing the passenger seats 22 are be installed. The seat groups 24 are positioned above the seat tracks 26 such that the legs 40 of each seat group are aligned with the seat tracks 26. Generally, the fastening tab 48 of the seat legs 40 is, at its widest point, wider than the distance between the arms 62 of the seat engagement portion 54 of the seat track. However, at various apertures along the length of the seat track 26, the distance between the arms 62 increases to permit passage the tab 48. It is at these regions that the fastening tab 48 is inserted past the arms 62 to within the seat engagement portion 54. The seat group 24 is then moved along the seat track 26 such that the tab 48 is moved to a point in the seat track 26 where the distance between the arms 62 is less than the width of the tab 48 to lock the tab 48, and thus the seat group 24, to the seat track 26. To insure that the tab 48 does not return to the area of the seat track 26 where the distance between the arms 62 is widened, the seat leg 40 is be secured into position along the seat track 26 in any conventional manner, such as by a bolt.

The connector 74 is positioned at or proximate to the leg 40 either before the legs 40 of the seat groups 24 are secured to the seat tracks 26. If the seat leg 40 is manufactured to include the connector 74, the connector 74 can be rotated, for example, via the hinged fastening device 94 to an extended position in which the connector 74 extends from the leg 40 approximately parallel to the floor 20 and approximately perpendicular to the leg 40. In this extended position the connector 74 places the contacts 86 in a position in which they are operable to make electrical contact with the extendable cable 72.

The extendable cable 72 is extended between the connector 74 of different seat groups 24. Specifically, the connector 74 is positioned within the seat track 26 such that the connector 74 connects to the extendable cable 72 to the wire harness 55. Finally, the seat track cover 32 is inserted over the seat track 26 and the extendable cable 72. To accommodate the seat legs 40, a section of the top portion 68 of the seat track cover 32 insertable or retractable to vary the length. The seat track cover 32 is secured to the floor 20 using an snap coupling mechanism as previously described.

It must be noted that while the power system 28 are described as distributing power to the passenger seats 22, the systems can also be used to distribute data to the passenger seats 22. For example, data distribution can be performed using conventional communication over power line systems.

It must also be noted that the passenger cabin 18 can be outfitted with multiple power systems at each seat group 24. The multiple power system(s) can be provided at the same seat track 26 or different seat tracks 26. The use of multiple power systems is useful to provide separate power systems for both power and data. Further, a first power system at the seat track 26 can be used for current delivery and a second power system can be used as a current return.

The power systems can further include a data strip (not shown) that carries both optical data and electrical current.

For example, a clear plastic with sufficiently high dielectric to insulate a power conductor, such as, can be co-extruded around one or more of the conductors with a clear plastic interior and an opaque plastic exterior.

The present invention, while being especially well suited and advantageous for use on mobile platforms, could also just as easily be implemented in a fixed structure having a plurality of seats. Such an implement would also significantly reduce the complexity of the cabling and connectors needed to supply power and or data lines to the seats.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

The invention claimed is:

1. A system for conducting a signal between a signal source and a seat comprising:
   a first connector housing secured to a first seat leg and movable between a conductive position and a nonconductive position;
   a second connector housing secured to a second seat leg and movable between a conductive position and a nonconductive position;
   a first connector of a seat electronic subsystem mounted to said first connector housing;
   a second connector of said seat electronic subsystem mounted to said second connector housing; and
   a conductor operable to mate with at least one of said first connector and said second connector when said connector housings are in said conductive position for conducting at least one of data and electricity to from the seat;
   wherein said first connector housing and said second connector housing are each moved to a raised position to facilitate installation and repositioning of said seat when in said nonconductive positions.

2. The system of claim 1, wherein said first housing is pivotally connected to said first seat leg.

3. The system of claim 2, wherein said second housing is pivotally connected to at least one of said first seat leg and said second seat leg.

4. The system of claim 1, wherein said conductor is a coiled conductor.

5. The system of claim 1, wherein said conductor is housed within a seat track cover.

6. The system of claim 1, wherein said conductor connects one of said first and second connectors to a source of at least one of data and electricity.

7. The system of claim 1, wherein said conductor connects one of said first and second connectors to a third connector.

8. The system of claim 6, wherein said source is a fiber optic source.

9. A system for providing a signal between a signal source and seats of a mobile platform comprising:
   a seat track;
   a seat secured to said seat track;
   a first connector housing proximate said seat track at a first end of a passenger seat and movable between a conductive position in which said first housing is at least substantially parallel to said seat track and a nonconductive position in which said first housing is not parallel to said seat track;
   a second connector housing proximate said seat track at a second end of said passenger seat and movable between a conductive position in which said second housing is at least substantially parallel to said seat track and a nonconductive position in which said second housing is not parallel to said seat track so as to facilitate installation and repositioning of said seat;
   a first connector of a seat electronic subsystem mounted to said first housing;
   a second connector of said seat electronic subsystem mounted to said second housing; and
   a conductor positioned at said seat track and operable to mate with at least one of said first connector and said second connector when said housings are in said conductive position to conduct at least one of data and electricity to or from the seat.

10. The system of claim 9, wherein said first housing is pivotally connected to said passenger seat and operable to be positioned in a retracted position to protect said first connector when said first connector is not in use.

11. The system of claim 10, wherein said second housing is pivotally connected to said passenger seat and operable to be positioned in a retracted position to protect said second connector when said second connector is not in use.

12. The system of claim 9, wherein said conductor is housed in a seat track cover.

13. The system of claim 9, wherein said conductor connects one of said first and second connectors to a source of at least one of data and electricity.

14. The system of claim 9, wherein said conductor connects one of said first and second connectors to a third connector.

15. The system of claim 12, further comprising locking the seat track cover to the seat track using a locking member.

16. A method for distributing signals along a seat track throughout a mobile platform cabin, comprising:
   mounting a passenger seat to a seat track of a passenger cabin;
   rotating a first connector housing of the passenger seat from a position in which the first connector housing is approximately perpendicular to a longitudinal length of the seat track to a position in which the first connector housing is approximately parallel to a longitudinal length of the seat track;
   rotating a second connector housing of the passenger seat from a position in which the second connector housing is approximately perpendicular to a longitudinal length of the seat track to a position in which the second connector housing is approximately parallel to a longitudinal length of the seat track; and
   connecting a conductor seated at the seat track to a connector of one of the first and second connector housings to conduct signals to and from the seat.

17. The method of claim 16, wherein said connecting step further comprises using the conductor to connect a connector of one of the first and second housings to a third connector.

18. The method of claim 16, wherein said connecting step further comprises using the conductor to connect a connector of one of the first and second housings to a source of at least one of data and electricity.

19. The method of claim 16, wherein said connecting step further comprises mounting the conductor to a seat track cover and securing the seat track cover to the seat track.

20. The method of claim 19, wherein said connecting step further comprises locking the seat track cover to the seat track using a locking member.

21. A system for transferring signals along a seat track to or from a mobile platform seat mounted to a seat track of a mobile platform cabin comprising:
- a first connector housing rotatably secured to a first seat leg of said mobile platform seat;
- a second connector housing rotatably secured to a second seat leg of said mobile platform seat;
- a first connector of a seat subsystem mounted to said first housing, said seat subsystem operable to provide at least one of current and data to the seat;
- a second connector of said seat subsystem mounted to said second housing; and
- a conductor extending generally parallel to said seat track operable to mate with at least one of said first connector and said second connector for conducting signal to and from the seat;
- wherein said first housing and said second housing are each pivotally rotated to a raised position when said seat is moved, installed, or removed from the cabin to protect said first and second housings;
- wherein said first housing and said second housing are each rotated to a lowered position when said seat is secured to the seat track so that the first housing and second housing are substantially parallel with the seat track.

* * * * *